(12) United States Patent
Boms et al.

(10) Patent No.: US 9,205,516 B2
(45) Date of Patent: Dec. 8, 2015

(54) HYDRAULIC WHEEL SET PRESS

(75) Inventors: Manfred Boms, Wegberg (DE);
Hans-Joachim Reiche, Erkrath (DE);
Alfred Heimann, Aachen (DE)

(73) Assignee: Hegenscheidt-MFD GmbH & Co. KG,
Erkelenz (DE)

( * ) Notice: Subject to any disclaimer, the term of this patent is extended or adjusted under 35 U.S.C. 154(b) by 1698 days.

(21) Appl. No.: 12/673,028

(22) PCT Filed: Aug. 14, 2008

(86) PCT No.: PCT/DE2008/001342
§ 371 (c)(1),
(2), (4) Date: Nov. 4, 2011

(87) PCT Pub. No.: WO2009/021500
PCT Pub. Date: Feb. 19, 2009

(65) Prior Publication Data
US 2012/0047701 A1 Mar. 1, 2012

(30) Foreign Application Priority Data
Aug. 16, 2007 (DE) .................... 20 2007 011 481 U

(51) Int. Cl.
*B23P 19/02* (2006.01)
*B23P 19/027* (2006.01)
*F15B 11/22* (2006.01)
*F15B 15/14* (2006.01)

(52) U.S. Cl.
CPC ............. *B23P 19/021* (2013.01); *B23P 19/027* (2013.01); *F15B 11/22* (2013.01); *F15B 15/1404* (2013.01); *F15B 2211/6336* (2013.01); *F15B 2211/782* (2013.01); *Y10T 29/5383* (2015.01); *Y10T 29/53826* (2015.01)

(58) Field of Classification Search
CPC .......... B23P 6/02; B23P 15/10; B23P 19/021; B23P 19/04; B23P 19/10
See application file for complete search history.

(56) References Cited

U.S. PATENT DOCUMENTS

| | | | |
|---|---|---|---|
| 3,848,525 A | 11/1974 | Kenet et al. | |
| 3,916,499 A * | 11/1975 | Frame et al. | 29/718 |
| 3,995,361 A | 12/1976 | Scheller et al. | |
| 4,214,363 A | 7/1980 | Rickrode et al. | |
| 5,421,229 A * | 6/1995 | Grossmann et al. | 82/124 |
| 6,128,814 A * | 10/2000 | Belka et al. | 29/407.08 |
| 2011/0098969 A1* | 4/2011 | Knudsen | 702/150 |
| 2012/0047701 A1* | 3/2012 | Boms et al. | 29/251 |

FOREIGN PATENT DOCUMENTS

GB 750282 A 6/1956
WO 2007/059723 A 5/2007

* cited by examiner

*Primary Examiner* — Lee D Wilson
(74) *Attorney, Agent, or Firm* — Harness, Dickey & Pierce, P.L.C.

(57) ABSTRACT

The invention relates to a hydraulic wheel set press for the simultaneous pressing of two wheel (1, 2) or brake disks on a wheel axis (3) having a frame construction (4) mounted on a base (5), said frame construction being comprised of two identical vertical press stands (6, 7) connected to one another in a fixed manner at a mutual distance via horizontal traverses (8, 9). The press stands (6, 7) each have a housing (10, 11) serving to accommodate a centering cylinder (12) engaging the wheel axis (3) on one end (14 15). In addition, a press cylinder (13) is provided concentrically to the centering cylinder (12). said press cylinder engaging the wheel (1, 2) or brake disk to be pressed, as well as control devices (22) for loading each of the two cylinders (12, 13) with a pressure medium. Measurement devices (20, 21) are provided on the base (5) that detect the lift of each of the cylinders (12, 13) and are connected to a control device (22) provided for regulating the loading of the cylinders (12, 13) with pressure medium as a function of the lift thereof.

6 Claims, 3 Drawing Sheets

HYDRAULIC WHEEL SET PRESS

CROSS-REFERENCE TO RELATED APPLICATIONS

Figure 1:
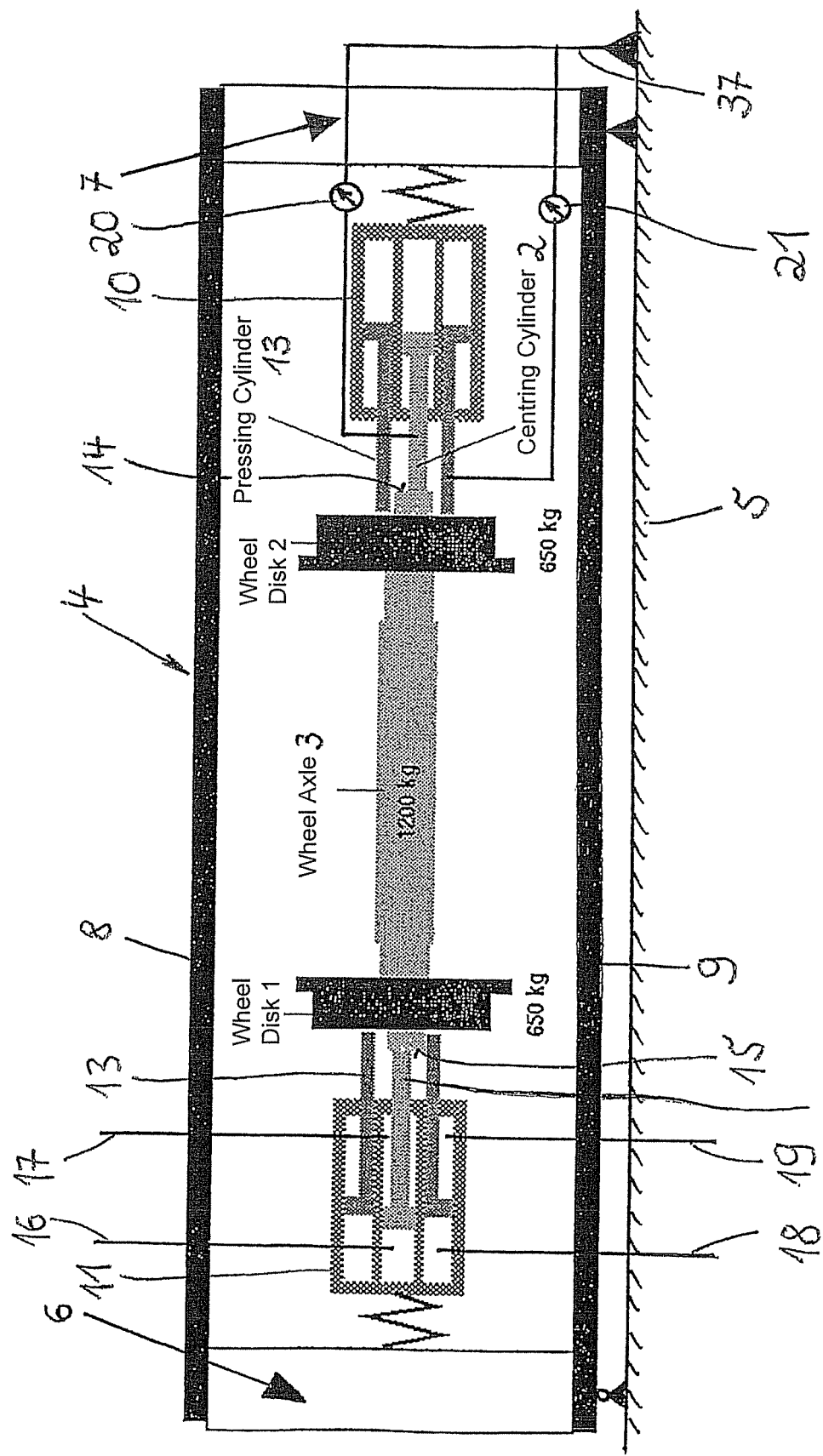

This application is a 371 U.S. National Stage of International Application No. PCT/DE2008/001342, filed Aug. 14, 2008. This application claims the priority to German Patent Application No. DE 202007011481.8, filed Aug. 16, 2007. The disclosures of the above applications are incorporated herein by reference.

The invention relates to a hydraulic wheel set press for simultaneous pressing of two wheel or brake disks on a wheel axle having a frame construction mounted on a foundation comprising two similar vertical press stands, which are connected to one another in a fixed manner at a mutual distance via horizontal traverses. The press stands each have a housing serving to accommodate a centring cylinder engaging the wheel axis at one end, and also a press cylinder arranged concentric to the centring cylinder engaging the wheel or brake disc to be pressed, as well as control equipment for regulating each of the two cylinders with a pressure medium.

A hydraulic wheel set press of this kind is known for example from U.S. Pat. No. 3,995,361. Said machine has two front units, which are firmly connected identically and by traverses. In the front units are arranged a centric centring cylinder and a pressing cylinder surrounding concentrically the centric centring cylinder in each case. The centring cylinder is loaded with a pressure medium. If the centring cylinder is moved by pressure in the direction of the wheel axis, a pinion turns around the longitudinal axis of the centring cylinder (U.S. Pat. No. 3,995,361, column 3, lines 47 and 48). An outside source of force specifies the speed to the movement of the centring cylinder (U.S. Pat. No. 3,995,361, column 4, lines 1 and 2). Both centring cylinders are moved after being loaded with the pressure medium regarding its speed and axial distance synchronous to one another (U.S. Pat. No. 3,995,361, column 4, lines 7 to 12). Thereafter the wheel axis is centred in the axial direction within the wheel set press; a uniform movement of each wheel disk is facilitated on the seat on the wheel axis (U.S. Pat. No. 3,995,361, column 5, lines 30 to 33). While the wheels are pressed on the wheel axis, each ton of pressing force at the wheels decreases a ton of pressing force at the centring cylinder. Pre-stressing the press with force, which is higher than the pressing force for the wheels, offers resistance to the pressing force and guarantees that the wheel axis does not move while the wheel is pressed. This ensures a precision assembly of the wheels on the wheel axis, because there are no deformations of the press (U.S. Pat. No. 3,995,361, column 6, lines 8 to 16).

Pre-stressing the wheel set press up is done by the work piece wheel axis (U.S. Pat. No. 3,995,361, column 6, lines 29 and 30).

The mechanical synchronic control of the centring cylinders is unfavorable at the known wheel set press. Here it cannot be ensured that increased hydraulic thrust forces must be taken up also by the pinions, which provide for the synchronization of centring cylinders. As a consequence, an early, increased wear at the pinions of the synchronization drive sets in. It is to be assumed that the pressing forces, which are necessary, in order to bring the two wheel disks on the wheel axis, are always different, such differences act unfavorably on the control and the mechanics of the known wheel set press.

Thus the scope of the available invention is to suggest a wheel set press for synchronous pressing of brake or wheel disks on a wheel axis, with which the force equilibrium can be caused within the machine alone by the hydraulic pressure medium, with which the centring and the pressing cylinders are loaded.

Said task is solved by the measurement devices, which are provided on the foundation, on which the wheel set press stands, which seize the respective lift of the cylinders of the wheel set press and are connected with control equipment at the same time, which is foreseen in addition to regulate, as a function of the lift of the cylinders, the accommodating with pressure medium. In practice, the measurement device lies outside the machine and records the movements of the centring and pressing cylinders from a place, which is independent of the frame design of the wheel set press. Differences of movements of centring and pressing cylinders are detected and converted into appropriate control instructions regarding the quantity or the pressure of the supplied pressure medium. In this way, operation is performed in each phase of the process under optimum operating conditions.

According to the preferred embodiment, the housing in the press stands shows a centric cylinder chamber for accommodating the centring cylinder and a ring chamber surrounding the cylinder chamber concentrically for accommodating the pressing cylinder, as is known from the cited U.S. Pat. No. 3,995,361.

A simplification of the housing is obtained, if the housing shows a cylinder chamber, which is provided for accommodating the pressing cylinder and the pressing cylinder a centric cylinder chamber for accommodating the centring cylinder. Here a telescope-like arrangement of centring and pressing cylinders results in. Both the centring cylinder and the pressing cylinder show in each case two connections, by which the pressure medium is supplied to them and/or by which the pressure medium can run off.

A new measuring tape has proven well as measurement device for determining the lifts of the cylinders of the wheel set press, which with large accuracy indicates the respective position of the piston of the respective cylinder, which is extends into the $\frac{1}{100}^{th}$ of a millimeter.

In the following, the invention with two embodiments is described more in detail.

In each case it would show simplified and to a large extent schematic side view of:

FIG. 1 first embodiment of a wheel set press and

Figure 2:
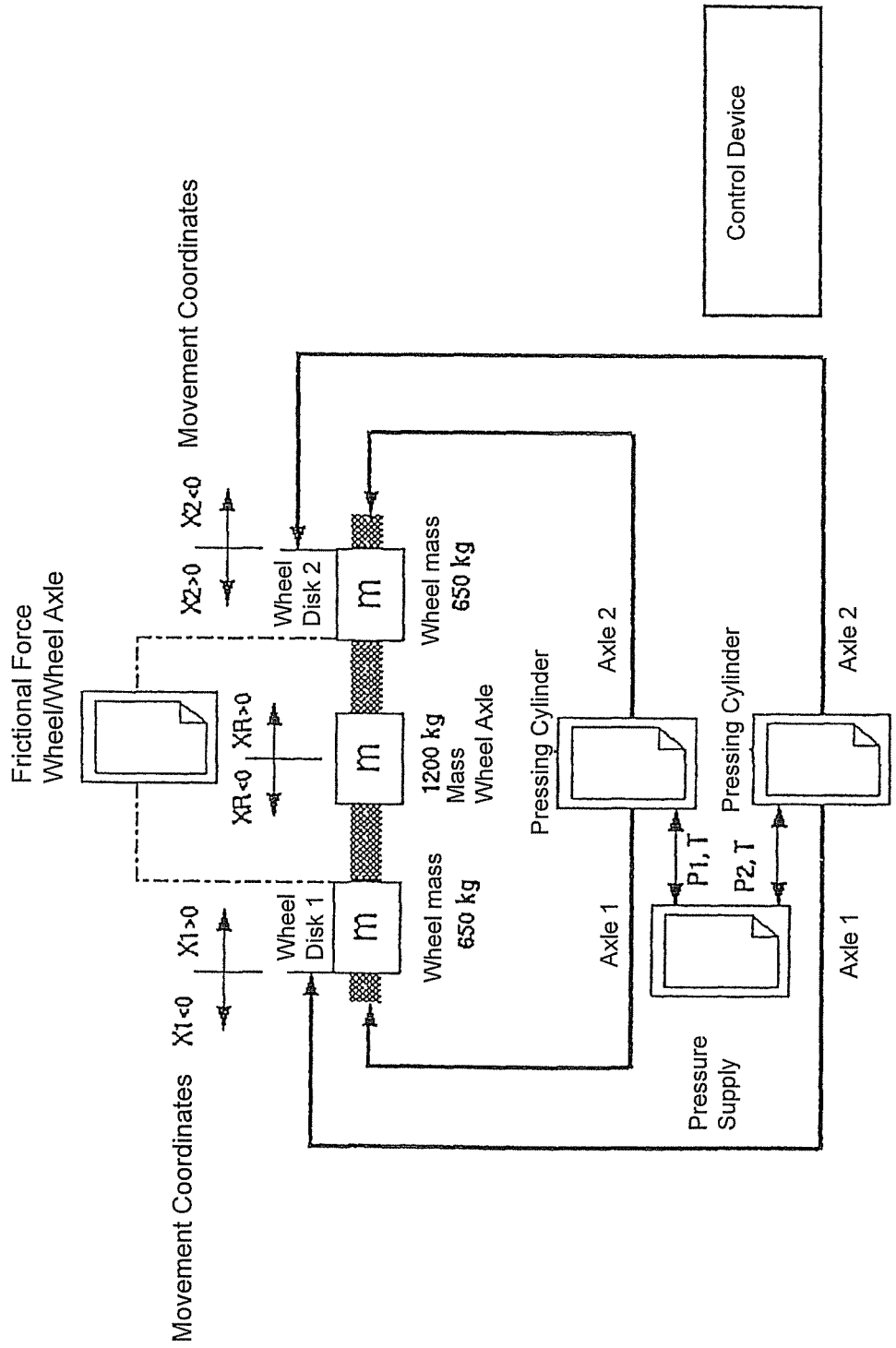

FIG. 2 a control scheme

Figure 3:
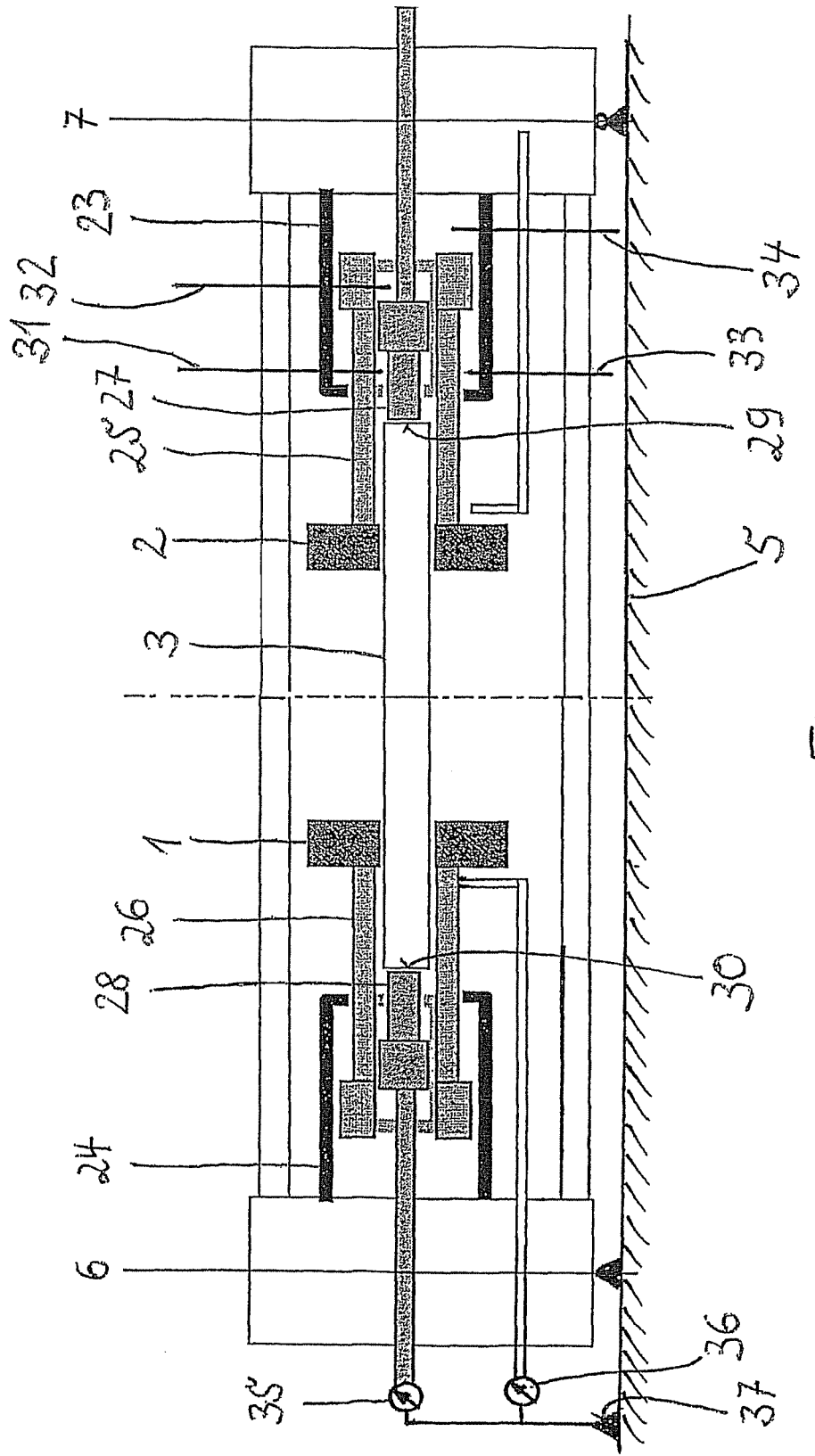

FIG. 3 second embodiment of a wheel set press.

The hydraulic wheel set press for simultaneous pressing of two wheel disks 1, 2 on a wheel axis 3 consists of a frame construction 4, which is mounted which on a foundation 5. In case of foundation 5 it can deal with the workshop platform. The frame construction 4 has two similar vertical press stands 6 and 7. As can be seen from FIG. 1, the two vertical press stands 6 and 7 have a mutual distance from each other. The press stands 6 and 7 are firmly connected by several horizontal traverses 8 and 9. Firmly connected with the press stands 6 and 7 is a housing 10 and 11. like the press stands 6 and 7, also the housings 10 and 11 are arranged in a similar and identical manner, but mirror-image to each other. In each housing 10 and 11, a centring cylinder 12 is flexibly mounted in horizontal manner. Concentrically around the centring cylinder 12, a pressing cylinder 13 is arranged. The centring cylinders 12 engage the outer ends 14 and 15 of the wheel axis 3. However, the pistons of the pressing cylinders 13 engage in each case at the wheel disks 1 and 2. Via outside connections 16 and 17 is supplied the centring cylinders 12 with a pressure medium, while the pressing cylinders 13 is loaded with a pressure medium via outside connections 18 and 19.

On the right side of diagram in FIG. 1 the centring cylinder 12 is connected with measurement device 20 is. The same is valid for the pressing cylinder 13, which is connected with measurement device 21. Both measurement devices 20 and 21 are led out of the frame construction 4 and connected via a support 37 connected with the foundation 5. The measurement device 20 records constantly the lift of the centring cylinder 12 and the measurement device 21 records constantly the lift of the pressing cylinder 13 at the same time on the right and the left side of the wheel set press. The signals of the measurement devices 20 and 21 are supplied to control equipment 22, which is schematically shown in FIG. 2. The signals of the measurement devices 20 form the movement coordinates X. The signals of the measurement devices 21 correspond to the frictional forces XR between the wheels 1 and 2 and the wheel axis 3. Thereupon, from a common pressure supply the centring cylinders 12 are loaded with pressure P1 and the pressing cylinders 13 with pressure P2.

The movement curve (pressing mode) is shown as follows:

A prepared wheel set is inserted into the frame construction 4. The prepared wheel set consists of wheel axis 3 and two wheel disks 1 and 2, which are already threaded on the wheel axis by the two outer ends 14 and 15. Said wheel set is now dealt with as follows: the pressing cylinders 13 and the centring cylinders 12 stay their respective initial position, i.e. they are inserted into the housings 10 and 11. Then the pressing cylinders 13 and the centring cylinders 12 drive at the same time into pre-position. The pressing cylinders 13 stop first in pre-position. Thereafter the centring cylinders 12 continue to move forward position-controlled, till they make contact with outer ends of 14 and 15 of the wheel axis 3. Here an increase of pressure results in the centring cylinders 12. However, the pressing cylinders 13 remain in pre-position. The centring cylinder 12 in contact with end 15 is changed over in power control, while the centring cylinder 12 in contact with end 14 remains in position control. Then the two pressing cylinders 13 are driven in position-controlled manner and position the wheels 1 and 2 on the wheel axis 3, this is the actual pressing mode. As soon as the pressing mode is terminated, the pressing cylinders 13 go back to the housings 10 and 11 in a position-controlled manner. The centring cylinders 12 meanwhile remain in their position and/or force control. Thereafter, inserting the centring cylinders 12 into their respective housings 10 and 11 likewise takes place in a position-controlled manner.

The results show that the system of hydraulic wheel set pressing operates in a stable fashion and shows a good response to setpoint changes. The static control error, positioning accuracy, amounts to less than 0.2 mm in the piston of centring cylinder and less than 0.4 mm in the piston of the pressing cylinder. The absolute positioning accuracy depends on the consideration of expansion of the frame construction 4. If the expansion of the frame construction 4 is not taken into account during computation of the desired value, the control error increases according to the expansion. In the available case the expansion of the frame construction, as is known, ideally considers up to 100 percent.

In the case of the embodiment shown in FIG. 3, the housings 23 and 24 were altered as compared to the housings 10 and 11 of FIG. 1. In the housings 23 and 24, first of all a pressing cylinder 25 and 26 is flexibly mounted lengthwise in each case. The piston of the pressing cylinder 25 engages at the wheel disk 2 and the piston of the pressing cylinder 26 at the wheel disk 1. Within the two pressing cylinders 25 and 26 is arranged a centring cylinder 27 and 28 in a telescopic manner having lengthwise sliding possibility. The centring cylinder 27 engages at the outer end 29 and the centring cylinder 28 at the outer end 30 of the wheel axis 3. Outside connections 31 and 32 supply the centring cylinders 27 and 28 with the pressure medium and outside connections 33 and 34 supply the pressing cylinders 25 and 26 with the required pressure medium. Similarly as in the case of the embodiment as per FIG. 1, the centring cylinders 27 and 28 are connected to measurement device 35 and the pressing cylinders 25 and 26 with measurement device 36; the cylinders can locate their support 37 on the foundation 5. The hydraulic cylinder casing of the centring cylinders 27 and 28 are formed here by the pistons of the pressing cylinders 25 and 26. The mechanics are less expensive, the diameters build smaller and it result in shorter lifts. Each side has two path measuring systems 35 and 36 and two pressure sensors P1 and P2 (not shown), which are arranged accordingly in the outside connections 32 and 34, as is known. In relation to the embodiment of FIG. 1, the embodiment of FIG. 3 is distinguished by reduced costs and smaller construction.

REFERENCE NUMERALS LIST

1. Wheel disk
2. Wheel disk
3. Wheel axis
4. Frame construction
5. Foundation
6. Press stands
7. Press stands
8. Horizontal traverse
9. Horizontal traverse
10. Housing
11. Housing
12. Centring cylinder
13. Pressing cylinder
14. Outer end
15. Outer end
16. Outer connection
17. Outer connection
18. Outer connection
19. Outer connection
20. Measurement device
21. Measurement device
22. Control device
23. Housing
24. Housing
25. Pressing cylinder
26. Pressing cylinder
27. Centring cylinder
28. Centring cylinder
29. Outer end
30. Outer end
31. Outer connection
32. Outer connection
33. Outer connection
34. Outer connection
35. Measurement device
36. Measurement device
37. Support

The invention claimed is:

1. A hydraulic wheel set press for simultaneously pressing two wheel or brake disks onto a wheel axle, the press comprising:
   a frame mounted on a foundation, the frame comprising two spaced apart vertical press stands rigidly connected to one another by a horizontal traverse;

a housing connected to each press stand;

a centering cylinder disposed within each housing, the centering cylinder engaging the wheel axle on an end of the wheel axle;

a press cylinder disposed within each housing and arranged concentrically to each centering cylinder, each press cylinder engaging a wheel or brake disk to be pressed onto the axle;

at least one control device for loading the centering cylinders and the press cylinders with a pressure medium;

at least one measurement device for detecting the lift of the centering cylinders and the press cylinders, the at least one measurement device connected to the at least one control device;

wherein the at least one control device regulates the loading of the centering cylinders and the press cylinders with a pressure medium as a function of the lift detected by the at least one measurement device.

2. The hydraulic wheel set press according to claim 1, wherein the housing comprises a first centric cylinder chamber for accommodating the centering cylinder and a second centric cylinder chamber concentrically surrounding the first centric cylinder chamber for accommodating the pressing cylinder.

3. The hydraulic wheel set press according to claim 1, wherein the housing comprises an outer cylindrical chamber for accommodating the pressing cylinder and an inner cylindrical chamber for accommodating the centering cylinder, the outer cylindrical chamber being concentric with the inner cylindrical chamber.

4. The hydraulic wheel set press according to claim 3, wherein the centering cylinders and the pressing cylinders each include two connections for the pressure medium.

5. The hydraulic wheel set press according to claim 2, wherein the centering cylinder and the pressing cylinder each have two connections for the pressure medium.

6. The hydraulic wheel set press according to claim 1, wherein the at least one measurement device comprises at least one path measuring system connected to a piston of one of the centering cylinders or pressing cylinders and the foundation.

* * * * *

UNITED STATES PATENT AND TRADEMARK OFFICE
CERTIFICATE OF CORRECTION

PATENT NO. : 9,205,516 B2
APPLICATION NO. : 12/673028
DATED : December 8, 2015
INVENTOR(S) : Manfred Boms et al.

It is certified that error appears in the above-identified patent and that said Letters Patent is hereby corrected as shown below:

On the title page

Item (30) Foreign Application Priority Data, the phrase "20 2007 011 0481 U" should be replaced with --20 2007 011 481.8--.

Item (57) Abstract, in the 9th line, after "on one end", the phrase "(14 15)" should be replaced with --(14,15)--.

Item (57) Abstract, in the 11th line, after "concentrically to the centering cylinder", the phrase "(12)." should be replaced with --(12),--.

Signed and Sealed this
Fifth Day of April, 2016

Michelle K. Lee
*Director of the United States Patent and Trademark Office*